(12) United States Patent
Willett et al.

(10) Patent No.: US 6,789,070 B1
(45) Date of Patent: Sep. 7, 2004

(54) AUTOMATIC FEATURE SELECTION SYSTEM FOR DATA CONTAINING MISSING VALUES

(75) Inventors: Peter K. Willett, Coventry, CT (US); Robert S. Lynch, Jr., Groton, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/606,118

(22) Filed: Jun. 14, 2000

(51) Int. Cl.[7] ............................................. G06F 15/18
(52) U.S. Cl. ........................................ 706/20; 706/19
(58) Field of Search ............................ 706/20, 19, 15; 702/181; 700/30, 89

(56) References Cited

U.S. PATENT DOCUMENTS

| | | | | | |
|---|---|---|---|---|---|
| 5,109,438 | A | * | 4/1992 | Alves et al. | 382/243 |
| 5,765,127 | A | * | 6/1998 | Nishiguchi et al. | 704/208 |
| 5,999,893 | A | * | 12/1999 | Lynch et al. | 702/181 |
| 6,397,200 | B1 | * | 5/2002 | Lynch et al. | 706/20 |

OTHER PUBLICATIONS

Lynch, Jr. et al., "Bayesian Classification and the Reduction of Irrelevant Features From Training Data", Proceedings of the 37 IEEE Conference on Decision and Control, pp. 1591–1592, vol. 2, Dec. 1998.*

Lynch, Jr. et al., "Testing the Statistical Similarity of Discrete Observations Using Dirichlet Priors", Proceedings of the IEEE International Symposium on Information Theory, p. 144, Aug. 1998.*

Lynch, Jr. et al., "A Bayesian Approach to the Missing Features Problem in Classification", Proceedings of the 38th Conference on Decision and Control, pp. 3663–3664, Dec. 1999.*

Voz et al., "Application of Suboptimal Bayesian Classification to Handwritten Numerals Recognition", IEE Workshop on Handwriting Analysis and Recognition: A European Perspective, pp. 9/1–9/8, Jul. 1994.*

Filip et al., "A Fixed–Rate Product Pyramid Vector Quantization Using a Bayesian Model", Gobal Telecommunications Conference 1992, vol. 1, pp. 240–244, Dec. 1992.*

Kontkanen et al., "Unsupervised Bayesian Visualization of High–Dimensional Data", ACM, 2000, Retrieved from the Internet: Http://www.cs.helsinki.fl/research/cosco.*

Zhang et al., "Mean–Gain–Shape Vector Quantization Using Counterpropagation Networks", Canadian Conference on Electrica and Computer Engineering, Sep. 1995, vol. 1, pp. 563–566.*

Baggenstoss, P., "Class–Specific Feature Sets in Classification", IEEE Transactions on Signal Processing, Dec. 1999, Vo. 47, No. 12.*

Basu et al., "Estimating the Number of Undetected Errors: Bayesian Model Selection", Proceedings of the 9th Intl Symposium o Software Reliability Engineering, Nov. 1998.*

(List continued on next page.)

*Primary Examiner*—Anthony Knight
*Assistant Examiner*—Kelvin Booker
(74) *Attorney, Agent, or Firm*—James M. Kasischke; Michael F. Oglo; Jean-Paul A. Nasser

(57) ABSTRACT

An automatic feature selection system for test data with data (including the test data and/or the training data containing missing values in order to improve classifier performance. The missing features for such data are selected in one of two ways: first approach assumes each missing feature is uniformly distributed over its range of values whereas in the second approach, the number of discrete levels for each feature is increased by one for the missing features. These two choices modify the Bayesian Data Reduction Algorithm accordingly used for the automatic feature selection.

8 Claims, 2 Drawing Sheets

OTHER PUBLICATIONS

Fukunaga et al., "Effects of Sample Size in Classifier Design", IEEE Transactions on Pattern Analysis and Machine Intelligence Aug. 1999, vol. 11, No. 8.*

Lynch, Jr. et al., "Performance Consideration for a Combined Information Classification Test Using Dirichlet Priors", IEEE Transactions on Signal Processing, Jun. 1999, vol. 47, No. 6.*

Oehler et al., "Combining Image Compression and Classification Using Vector Quantization", IEEE Transactions on Pattern Analysis and Machine Intelligence, May 1995, vol. 17, No. 5.*

Xie et al., "Vector Quantization Technique for Nonparametric Classifier Design", IEEE Transactions on Pattern Analysis and Machine Intelligence, Dec. 1993, vol. 15, No. 12.*

Lynch, Jr. et al., "Bayesian Classification and Feature Reduction Using Uniform Dirichlet Priors", IEEE Transactions on Systems, Man, and Cybernetics–Part B: Cybernetics, Jun. 2003, vol. 33, No. 3.*

* cited by examiner

AUTOMATIC FEATURE SELECTION SYSTEM FOR DATA CONTAINING MISSING VALUES

CROSS-REFERENCE TO RELATED PATENT APPLICATIONS

Subject patent application is related to our previous filed U.S. Patent Applications entitled CLASSIFICATION SYSTEM AND METHOD USING COMBINED INFORMATION TESTING (Ser. No. 08/858,186, filing date of 2 May 1997) and DATA REDUCTION SYSTEM FOR IMPROVING CLASSIFIER PERFORMANCE (Ser. No. 09/285,173, filing date of 18 Mar. 1999) are incorporated herein by reference.

STATEMENT OF GOVERNMENT INTEREST

The invention described herein may be manufactured and used by of for the Government of the United States of America for governmental purposes without the payment of any royalties thereon or therefor.

BACKGROUND OF THE INVENTION (1) Field of the Invention

The present invention relates to system and more specifically to a classification technique which combines the information in training data (of known characteristics) and test data to infer about the true symbol probabilities prior to making a classification decision. In particular, it is related to an automatic feature selection system for data (training of known classes and input data of an known classes) containing missing values.

(2) Description of the Prior Art

The use of classification systems to classify input data into one of several predetermined classes is well known. Their use has been adapted to a wide range applications including target identification as a threat and non-threat conditions, medical diagnosis, speech recognition, digital communications and quality control systems.

For a given input X, classification systems decide to which of several output classes does the input X belong. If known, measurable characteristics separate classes, the classification decision is straightforward. However, for most applications, such characteristics are unknown, and the classification system must decide which output class does the input X most closely resemble. In such applications, the output classes and their characteristics are modeled (estimated) using statistics for the classes derived from training data belonging to known classes. Thus, the standard classification approach is to first estimate the statistics from the given training data belonging to known classes and then to apply a decision rule using these estimated or modeled statistics.

However, often there is insufficient training data belonging to known classes i.e., having known characteristics to accurately infer the true statistics for the output classes which results in reduced classification performance or more occurrences of classification errors. Additionally, any new information that arrives with the input data is not combined with the training data to improve the estimates of the symbol probabilities. Furthermore, changes in symbol probabilities resulting from unobservable changes in the source of test data, the sensors gathering data and the environment often result in reduced classification performance. Therefore, if based on the training data a classification system maintains a near zero probability for the occurrence of a symbol and the symbol begins to occur in the input data with increasing frequency, classification errors are likely to occur if the new data is not used in determining symbol probabilities.

Attempts to improve the classification performance and take advantage of information available in test data have involved combining the test data with the training data in modeling class statistics and making classification decisions. While these attempts have indicated that improved classification performance is possible, they have one or more drawbacks which limit or prevent their use for many classification systems.

One early approach to combining the training and test data to estimate class statistics is described in A. Nædas, "Optimal Solution of a Training Problem in Speech Recognition," *IEEE Trans. Acoust., Speech, Signal Processing*, vol. ASSP-33, no. 1 (1985), pp. 326–329. In Nædas, the input (test) data which comprised a sample to be classified was combined with the training data to obtain an estimate of the probability distribution for each of the classes. However, the result in Nædas showed that combining the test sample with the training data did not provide improved performance but resulted in classification decision based on a standard general likelihood ratio test.

It is known in prior art artificial intelligence systems to reduce data complexity by grouping data into worlds with shared similar attributes. This grouping of the data helps separate relevant data from redundant data using a co-exclusion technique. These methods search saved data for events that do not happen at the same time. This results in a memory saving for the systems because only the occurrence of the event must be recorded. The co-exclusive event can be assumed.

Bayesian networks, also known as belief networks are known in the art for use as filtering systems. The belief network is initially learned by the system from data provided by an expert, user data and user preference data. The belief network is relearned when additional attributes are identified having an effect. The belief network can then be accessed to predict the effect.

A method for reducing redundant features from training data is needed for reducing the training times required for a neural network and providing a system that does not require long training times or a randomized starting configuration.

Thus, what is needed is a classification system which can be easily and readily implemented, and is readily adaptable to various applications and which uses all the available data including the information in the training data and test data to estimate the true symbol probabilities prior to making a classification decision.

SUMMARY OF THE INVENTION

Accordingly, it is a general purpose and object of the present invention to provide a classifier which uses the information in the training and test data to estimate the true symbol probabilities wherein either the test data or the training data or both have missing values in it.

Another object of the present invention is to provide a classification system and method which uses quantized training data and test data with missing values therein to re-estimate symbol probabilities before each classification decision.

Yet another object of the present invention is the provision of a classification system which depends only on the available training data and test data with missing values therein and is readily implemented and easily adapted to a variety of classification applications.

It is a further object of the present invention to provide a combined classification system which combines the test data having missing values and the training data to simultaneously estimate the symbol probabilities for all output classes and classify the test data.

These and other objects made apparent hereinafter are accomplished with the present invention by providing a combined classification system which combines the information available in the training data and test data having missing values to estimate (or model).

This invention thus provides another object of the invention is that such classification system should not include redundant and ineffectual data.

A further object of the invention is to provide a method for reducing feature vectors to only those values which affect the outcome of the classification.

Accordingly, this invention provides a data reduction method for a classification system using quantized feature vectors for each class with a plurality of features and levels. The reduction algorithm consisting of applying a Bayesian data reduction algorithm to the classification system for developing reduced feature vectors. Test data is then quantified into the reduced feature vectors. The reduced classification system is then tested using the quantized test data.

A Bayesian data reduction algorithm is further provided having by computing an initial probability of error for the classification system. Adjacent levels are merged for each feature in the quantized feature vectors. Level based probabilities of error are then calculated for these merged levels among the plurality of features. The system then selects and applies the merged adjacent levels having the minimum level based probability of error to create an intermediate classification system. Steps of merging, selecting and applying are performed until either the probability of error stops improving or the features and levels are incapable of further reduction.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
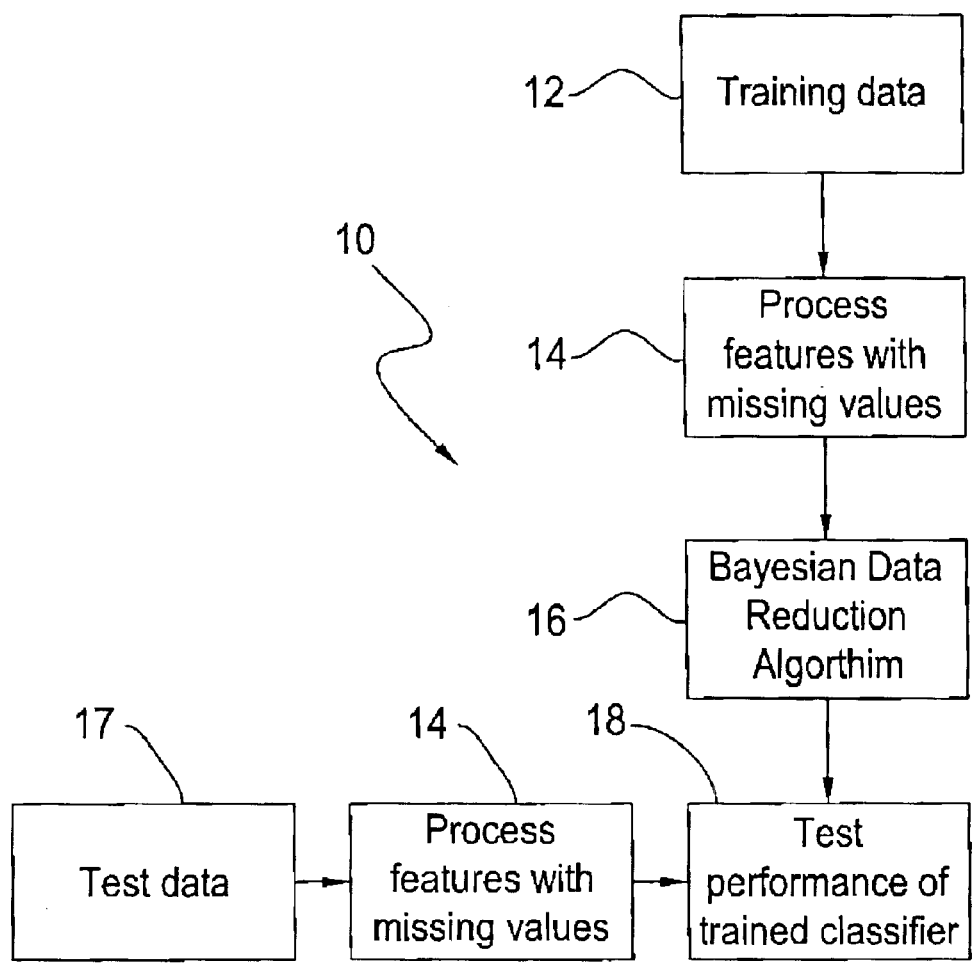
FIG. 1 is a block diagram illustrating implementation of subject invention.

The data reduction system 10 is illustrated in the FIG. 1. This figure provides a functional block diagram of the major components of the data reduction system. Intended users of this system should implement it using FIG. 1, FIG. 2, and the associated formulas and algorithms described below, by writing a computer program in the language of their choice.

In block 12 of the data reduction system all training data for each class are represented as quantized feature vectors. The classification can have two or more classes. In the case when there are two classes such as threat and non-threat conditions, there are $N_{target}$ quantized feature vectors for the target class and $N_{nontarget}$ quantized feature vectors for the nontarget class. Each feature vector is quantized by mapping it to a symbol. There are M possible symbols representing the number of discrete levels for a specific feature multiplied by the number of discrete levels for each feature. For example, a feature vector having three binary valued features can take on one of M=8 possible discrete symbols given by; (0, 0, 0), (0, 0, 1), . . . , (1, 1, 1).

In some cases, either one or all of the features will be continuous, and these features must then be discretized before the vectors are mapped to one of the M possible symbols. If a given set of thresholds does not exist for discretizing a particular feature then the feature should be discretized into a sufficient number of levels via percentiles. Ten discrete levels has been found to be adequate for most continuous features; however, other levels can be established depending on the sensitivity of the system to the feature vector and the capacity of the computer performing the data reduction. That is, to discretize a feature into ten levels its training data are used to define ten thresholds corresponding to ten percentile regions (e.g., the first threshold is found such that 10 percent of the data are less than it in value). This procedure is then repeated for the remaining continuous features. Notice also that there is no specified limit to the number of features used in the data reduction system. If the computational limits of the computer platform allow, using all known features is best. However, the same features must be used for each class, but it is not necessary that the initial quantization of each feature be the same.

Block 12 of FIG. 1, the quantized feature vectors of the training data for each class are assumed to be made up of either or both of the following two observation types: features which are represented by discrete values, and missing features which have no values (and represented by the same dummy variable). For example, with three binary features a possible feature vector that is missing a single feature might appear as (1,1,x), where x represents the missing value. In this case, x can have the value of 0 or 1 so that this feature vector has a cardinality (which depends on the number of discrete levels assigned to each feature) of two. Notice, the missing features are assumed to appear according to an unknown probability distribution.

The missing feature information can be modeled using two different approaches in step 14 for both the training data provided in step 12 and the test data provided in step 17. With the first of these approaches (Method 1), the Dirichlet prior is extended to accommodate missing features in the natural way. That is, each missing feature is assumed to be uniformly distributed over its range of values. For example, in the previous paragraph, the feature vector (1,1,x) is assigned to both values associated with its cardinality, and they are both considered equally likely to occur. In the second approach (Method 2), the number of discrete levels for each feature is increased by one so that all missing values for that feature are assigned to the same level (M must also be appropriately increased). Again returning to the feature vector (1,1,x) of the previous paragraph, in this case the dummy variable x would be assigned a single value of 2. Observe that Method 2 is a better model when the missing feature information is relevant to correctly classifying the data.

In general, the specific method chosen to deal with missing features depends upon the level of prior knowledge existing about the data (for more on this on this see the publications in Section 7, Part I, of the disclosure). Typically, if no prior knowledge about the data is available, or, if missing feature values are no more likely to occur with one class than they are with another, then Method 1 should be used. However, if it is known a priori that missing features are more likely to occur in one of the classes then Method 2 should be used, as the missing feature values represent relevant classification information.

Block 14 of FIG. 1 represents the Bayesian Data Reduction Algorithm (BDRA) is simultaneously applied to the quantized training data of all classes. The input of the quantized test data and the test performance of trained classifier are represented in block 17 and 18 respectively in FIG. 1. The algorithm uses the Dirichlet distribution as a noninformative prior. The Dirichlet respresents all symbol probabilities as uniformly-distributed over the positive unit-hyperplane. Using this prior, the algorithm works by reducing the quantization fineness, M, to a level which minimizes the average conditional probability of error, P(e).

Figure 2:
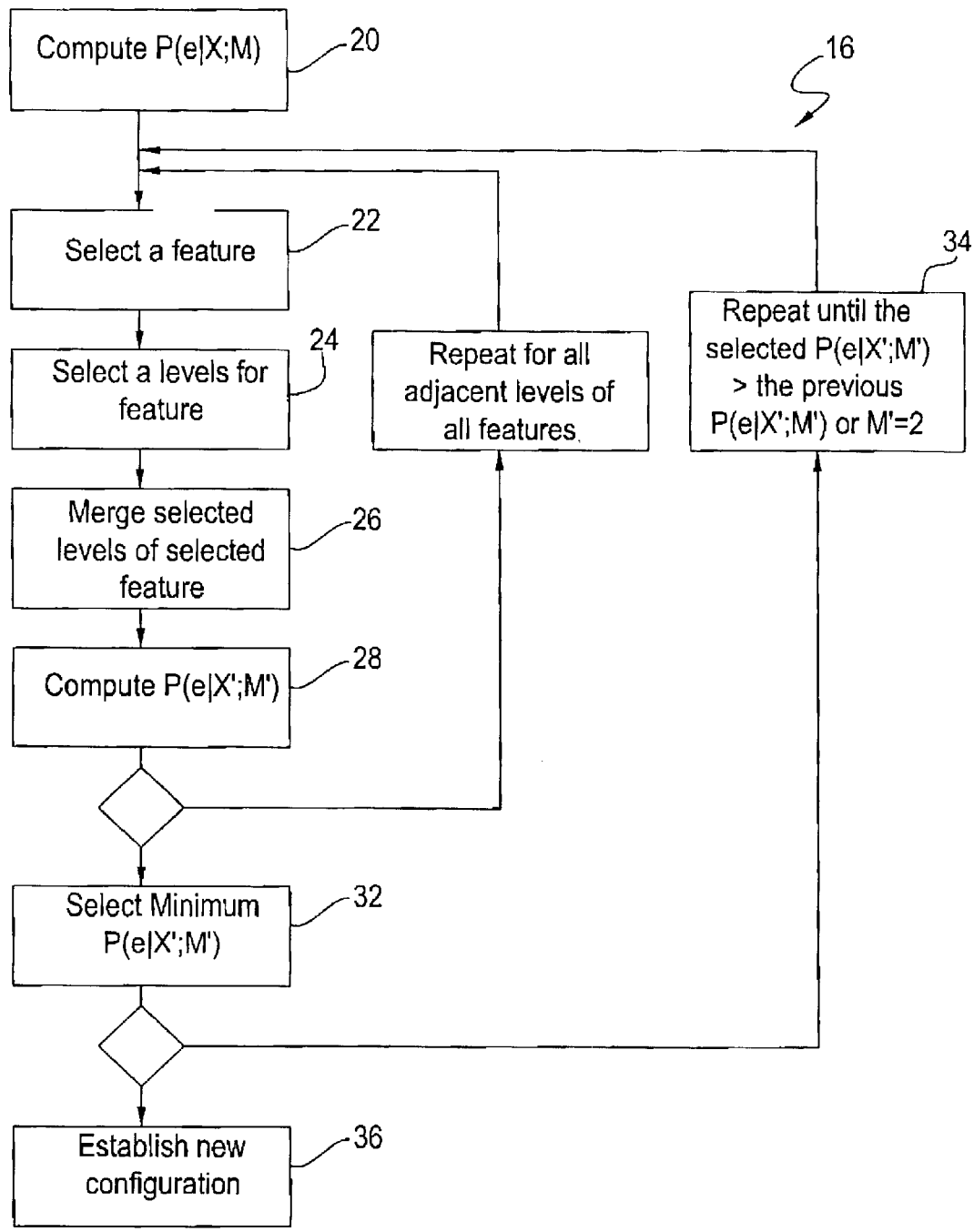
FIG. 2 is a block diagram illustrating the details of the Bayesian Data Reduction Algorithm (BDRA).

The formula for P(e) is the fundamental component of this algorithm, and in its typical form, which is also the form used for Method 2, it is given by $$f(z) = \int_p \prod_{i=1}^{N} \left[ \sum_{l \in w_i} p_l \right] f(p) dp \qquad (1)$$

where, in the following k and l are exchangeable. This formula is applicable when the missing feature values are incremental i.e., as described above as method 2. However, for uniform distribution of missing feature values i.e., method 1, the following formula should be used.

$$f(y | w_k, H_k) = \frac{(N_k + M - 1)!(N_y)!}{(N_k + N_y + M - 1)!} \prod_{i=1}^{M} \frac{\left( \sum j \varepsilon s_i \frac{1}{|\omega k j|} + y_i \right)!}{\left( \sum j \varepsilon s_i \frac{1}{|\omega k j|} \right)!(y_i)!}$$

where
$\omega_{y,j}$ is a single observation of a feature vector in the test data and
$|\omega_{y,j}|$ is its cardinality
$S_{y,i}$ is defined as the event of being all those $\omega_{y,j}$ that can take on symbol i.
$\omega_{k,j}$ is a single observation of a feature vector for class k, and
$|\omega_{k,j}|$ is its cardinality.
$S_i$ is defined as the event of being all those $\omega_{k,j}$ that can take is on symbol i for class k.

$$z_k = f(y | x_k, H_k) = \frac{N_y!(N_k + M - 1)!}{(N_k + N_y + M - 1)!} \prod_{i=1}^{M} \frac{(\chi_{k,i} + y_i)!}{\chi_{k,i}! Y_i!};$$

k,l ∈{target, nontarget}, and k≠l;
$H_k: \vec{P}_y = \vec{P}_k$;
M is the number of discrete symbols;
$X \equiv (x_k, x_k)$ is all training data;
$x_{k,i}$ is the number of $i^{th}$ symbol in the training data for class and $N_k\{N_k = \Sigma_{i=1}^M x_{k,i}\}$;
$y_i$ is the number of $i^{th}$ symbol type in the test data and $N_y\{N_y = \Sigma_{i=1}^M y_i\}$;

The use of the modified BDRA is shown in FIG. 2 wherein given formula (1), the algorithm is implemented by using the following iterative steps as shown in FIG. 2.

In block 20, using the initial training data with quantization M, formula (1) is used to compute P(e|X; M). In step 22, a feature is selected arbitrarily, and then a two adjacent levels of the feature are selected in block 24. Block 26 merges the training data of those adjacent quantized symbols. In the binary case, quantized symbols containing a binary zero are combined with those containing a binary one effectively removing the feature. In the continuous case, two levels are merged into one level removing the distinction between the two levels. Block 28 uses the newly merged training data, X', and the new quantization, M', and again computes P(e|X'; M'). Step 30 is a loop wherein Blocks 22 through 28 are repeated for all adjacent feature quantizing levels, and all remaining features.

The algorithm then selects the merged configuration having the minimum probability of error, P(e|X'; M') in block 32 from the probabilities computed in block 28. The configuration with the minimum probability of error (or maximum probability of recognition) is then used as the new training data configuration for each class (i.e., the new quantization, and its associated discrete levels and thresholds for each feature). Block 34 is another loop which repeats blocks 22 through 32 until the probability of error decreases no further, or until features can no longer be reduced, i.e. M'=2.

In cases when the several probabilities are the same, the minimum can be selected arbitrarily. As an alternative the multiple configurations each having the same minimum probabilities can all be applied. By applying all configurations, computer processing time can be reduced at some increase in error. Accordingly, arbitrary selection of a single configuration is the preferred alternative.

Observe that the algorithm described above is "greedy" in that it chooses a best training data configuration at each iteration (see block 34 above) in the process of determining a best quantization fineness. A global search over all possible merges and corresponding training data configurations may in some cases provide a lower probability of error at a higher computational cost. However, a simulation study involving hundreds of independent trials revealed that only about three percent of the time did the "greedy" approach shown above produce results different than a global approach. Additionally, the overall average probability of error for the two approaches differed by only an insignificant amount.

When the Bayesian data reduction algorithm finds the new quantization fineness upon completion of block 34 in FIG. 2, this new configuration can be established as in block 36. The resulting trained classifier can be tested as block 17 of FIG. 1. To test the classifier all test data from block 17 are now quantized using the remaining features, and their associated discrete levels and threshold settings that were found in step 12 for the training data.

An advantage of the Bayesian data reduction algorithm of the current invention is that it permanently reduces, or eliminates, irrelevant and redundant features (as opposed to appropriately adjusting the weights of a neural network and keeping all features) from the training data. Thus, with the current invention features are important to correct classification are highlighted. With this, the algorithm presented here does not require the long training times that can accompany a neural network, nor does it require a randomized starting configuration.

In light of the above, it is therefore understood that within the scope of the appended claims, the invention may be practiced otherwise than as specifically described.

What is claimed is:

1. A data reduction method for a classification system implemented as software within a computer comprising the steps of:

receiving training data in the classification system;
processing said received training data to account for missing values in said received training data;
forming quantized feature vectors for each class of the classification system from said processed training data, each quantized feature vector having a plurality of features, and each feature having data mapped into levels;

applying a Bayesian data reduction algorithm to said classification system having quantized feature vectors to develop reduced feature vectors for said classification system;

receiving test data;

processing said received test data to account for missing values in said received test data;

quantizing said processed test data into said reduced feature vectors; and testing said classification system having said reduced feature vectors using said quantized test data in order to provide tested quantized test data.

2. The method of claim 1 wherein said step of processing said received training data and said received test data as received data comprises:

establishing a dummy value for each missing value in said received data; and creating a value for the established dummy value that assumes uniform distribution of the missing values for a feature.

3. The method of claim 1 wherein said step of processing said received training data and said received test data as received data comprises:

establishing a dummy value for each missing value in said received data; and creating a new level for the feature of the quantized feature vector having the missing value, said new level being used for all dummy values in that feature.

4. The method of claim 1 wherein said step of processing said received training data and said received test data as received data comprises:

establishing a dummy value for each missing value in said received data;

determining whether the presence of the missing value in a feature provides information concerning classification or whether the missing value is subject to uniform distribution throughout the feature;

if the presence of the missing value in a feature provides information, creating a new level for the feature of the quantized feature vector having the missing value, said new level being used for all dummy values in that feature; and if the missing value is subject to uniform distribution throughout the feature, creating a value for the established dummy value that assumes uniform distribution of the missing values for a feature.

5. A data reduction method for a classification system implemented as software within a computer comprising the steps of:

receiving training data in the classification system;

forming quantized feature vectors for each class of the classification system from said received training data, each quantized feature vector having a plurality of features, and each feature having data mapped into levels;

applying a Bayesian data reduction algorithm to said classification system having quantized feature vectors to develop reduced feature vectors for said classification system;

receiving test data;

processing said received test data to account for missing values in said received test data;

quantizing said processed test data into said reduced feature vectors; and testing said classification system having said reduced feature vectors using said quantized test data in order to provide tested quantized test data.

6. The method of claim 5 wherein said step of processing said received test data comprises:

establishing a dummy value for each missing value in said received test data; and creating a value for the established dummy value that assumes uniform distribution of the missing values for a feature.

7. The method of claim 5 wherein said step of processing said received test data comprises:

establishing a dummy value for each missing value in said received test data; and creating a new level for the feature of the quantized feature vector having the missing value, said new level being used for all dummy values in that feature.

8. The method of claim 5 wherein said step of processing said received test data comprises:

establishing a dummy value for each missing value in said received test data;

determining whether the presence of the missing value in a feature provides information concerning classification or whether the missing value is subject to uniform distribution throughout the feature;

if the presence of the missing value in a feature provides information, creating a new level for the feature of the quantized feature vector having the missing value, said new level being used for all dummy values in that feature; and if the missing value is subject to uniform distribution throughout the feature, creating a value for the established dummy value that assumed uniform distribution of the missing values for a feature.

* * * * *